US010442012B2

(12) United States Patent
Genini et al.

(10) Patent No.: US 10,442,012 B2
(45) Date of Patent: Oct. 15, 2019

(54) MACHINING TOOL (71) Applicant: Mikron Tool SA Agno, Agno (CH)

(72) Inventors: Mattia Genini, Sant Antonino (CH); Alberto Gotti, San Pietro die Stabio (CH); Markus Schnyder, Bosco Luganese (CH)

(73) Assignee: Mikron Tool SA Agno, Agno (CH)

( * ) Notice: Subject to any disclaimer, the term of this patent is extended or adjusted under 35 U.S.C. 154(b) by 154 days.

(21) Appl. No.: 15/480,936

(22) Filed: Apr. 6, 2017

(65) Prior Publication Data
US 2017/0291229 A1 Oct. 12, 2017

(30) Foreign Application Priority Data
Apr. 7, 2016 (CH) .......................... 448/16

(51) Int. Cl.
*B23B 51/06* (2006.01)
*B23B 51/02* (2006.01)

(52) U.S. Cl.
CPC .............. *B23B 51/06* (2013.01); *B23B 51/02* (2013.01); *B23B 2250/12* (2013.01); *B23B 2251/18* (2013.01)

(58) Field of Classification Search
CPC ............................ B23B 51/06; B23B 2250/12
See application file for complete search history.

(56) References Cited

U.S. PATENT DOCUMENTS

| 2,541,849 A * | 2/1951 | Villeneuve | B23B 51/06 |
| | | | 408/59 |
| 3,555,935 A * | 1/1971 | Dorrenberg | B21C 23/085 |
| | | | 29/423 |
| 4,826,364 A * | 5/1989 | Grunsky | B23B 51/06 |
| | | | 408/59 |
| 2005/0244235 A1 | 11/2005 | Kleiner | |
| 2006/0006576 A1* | 1/2006 | Karos | B21C 23/147 |
| | | | 264/209.2 |
| 2013/0223943 A1* | 8/2013 | Gey | B23B 51/06 |
| | | | 408/59 |
| 2015/0321267 A1 | 11/2015 | Takai | |

(Continued)

FOREIGN PATENT DOCUMENTS

| DE | 3314349 A1 | 10/1984 |
| EP | 2952278 A1 | 12/2015 |
| JP | 64-042816 U1 | 3/1989 |

(Continued)

*Primary Examiner* — Eric A. Gates
(74) *Attorney, Agent, or Firm* — The Webb Law Firm (57) ABSTRACT

A machining tool (1) comprises a clamping section (2), which extends along a central axis (M), a cutting section (3), which adjoins the clamping section (2) and has a nominal diameter (DN), and at least one cooling duct (4), which preferably extends in the clamping section (2) and in the cutting section (3), wherein the cross-sectional shape of the cooling duct (4) is arranged in a cross-sectional region (Q) of the respective section (2, 3) in which the equivalent stress under a machining load has a value which is as small as possible, and/or wherein the cross-sectional shape of the cooling duct (4) is defined by an inner curve segment (5), an outer curve segment (6), which is arranged at a distance from the latter, and by means of two tangents (7) connecting the two curve segments (5, 6).

18 Claims, 6 Drawing Sheets

(56) References Cited

U.S. PATENT DOCUMENTS

2016/0059323 A1\* 3/2016 Riester .................... B23B 51/06
                                                        408/57
2016/0207119 A1\* 7/2016 Naruke ................... B23B 51/02

FOREIGN PATENT DOCUMENTS

| JP | 2004154883 A | \* | 6/2004 | | |
|----|----|----|----|----|----|
| SU | 1276446 A | \* | 12/1986 | | |
| WO | 2004056519 A2 | | 7/2004 | | |
| WO | WO 2010146839 A1 | \* | 12/2010 | ............. | B23B 51/06 |
| WO | WO 2014118881 A1 | \* | 8/2014 | ............. | B23B 51/06 |

\* cited by examiner

MACHINING TOOL

CROSS-REFERENCE TO RELATED APPLICATION

This application claims priority to Swiss Patent Application No. 00448/16 filed Apr. 7, 2016, the disclosure of which is hereby incorporated in its entirety by reference.

BACKGROUND OF THE INVENTION

Field of the Invention

The present invention relates to a machining tool, in particular a drilling tool, having a cooling duct.

Description of Related Art

From the prior art, it is known that, during a drilling process to produce a drilled hole, the drilling tool is cooled with a coolant or lubricated with a lubricating emulsion. Here, the coolant or lubricant can be brought to the cutting edge of the drilling tool in many different ways. For example, via internal fluid ducts arranged in the drilling tool and extending from the clamping shank to the drill tip. As an alternative, the coolant or lubricant can also be fed directly to the drill from the outside via a hose.

The arrangement of the fluid ducts, which extend as far as the drill tip, generally gives rise to the problem that the drill is greatly weakened. In particular, it can lead to fractures in the drill.

SUMMARY OF THE INVENTION

Starting from this prior art, it is the underlying object of the invention to provide a machining tool which overcomes the disadvantages of the prior art. In particular, the tool should be less susceptible to fractures.

According to this, a machining tool comprises a clamping section, which extends along a central axis, a cutting section, which adjoins the clamping section and has a nominal diameter, and at least one cooling duct. The cooling duct preferably extends in the clamping section and in the cutting section.

In a first embodiment of the invention, the cross-sectional shape of the cooling duct is arranged in a cross-sectional region of the respective section, i.e. the clamping section and/or the cutting section or the machining section, resp., in which the equivalent stress under a machining load has a value which is as small as possible.

In a second embodiment of the invention, the cross-sectional shape of the cooling duct is defined by an inner curve segment, an outer curve segment, which is arranged at a distance from the latter, and by means of two tangents connecting the two curve segments.

A third embodiment of the invention is characterized in that the cross-sectional shape of the cooling duct is arranged in a cross-sectional region of the respective section, i.e. the clamping section and/or the cutting section or the machining section, resp., in which the equivalent stress under a machining load has a value which is as small as possible, and in that the cross-sectional shape of the cooling duct is defined by an inner curve segment, an outer curve segment, which is arranged at a distance from the latter, and by means of two tangents connecting the two curve segments.

Common to all three embodiments is the fact that the tool is less susceptible to fractures by virtue of the corresponding design of the cross-sectional shape.

In the first embodiment, there is the advantage that the arrangement of the cross-sectional shape in a region in which the equivalent stress has a value which is as small as possible enables the cross-sectional shape to be optimized with respect to the stresses which occur during machining. Thus, the cross-sectional shape extends in regions in which only a correspondingly low stress occurs.

In the second embodiment, there is the advantage that the shape as such has a favourable effect on the stresses occurring in the tool. As a result, the fracture-promoting stress peaks can be reduced. The tool is therefore more robust.

The third embodiment combines the advantages of the first and second embodiments.

The expression "equivalent stress" is taken to mean a theoretical uniaxial mechanical stress, which represents a material stress similar to a real multi-axis stress condition. The term "equivalent stress" is known to a person skilled in the art in engineering mechanics, especially strength theory. As a particularly preferred option, equivalent stress is taken to mean the equivalent stress according to von Mises.

The expression "cross-sectional shape" is taken to mean the shape of the cooling duct which can be seen in a cross-sectional area extending transversely, i.e. at right angles, to the central axis.

The expression "cross-sectional region" is taken to mean a region of the machining tool in a cross section transversely, i.e. at right angles, to the central axis. In this region, the equivalent stress has a value which is as small as possible.

The expression "inner" and "outer" in connection with the curve segments is defined as the position of the curve segments in the cross section of the machining tool. The inner curve segment is closer to the central axis than the outer curve segment in relation to the central axis M.

The equivalent stress in the said cross-sectional region is preferably in a range of from 10 to 25% of the maximum equivalent stress occurring in the tool. As a particularly preferred option, therefore, the cooling duct is arranged in a cross-sectional region in which the equivalent stress is in a range of from 10 to 25%. This is subject, in particular, to the proviso that the cross-sectional region is situated outside an inner boundary diameter of at least 10% or at least 15% or at least 20%. The comparison with the maximum equivalent stress preferably relates to the same section plane.

The cross-sectional shape of the cooling ducts preferably fills the said cross-sectional region to the maximum, in particular with the proviso that the cross-sectional shape is situated outside an inner boundary diameter of at least 10% or at least 15% or at least 20%. This means that the cross-sectional area is optimized over the cross-sectional region in which the equivalent stress is as low as possible. By this means, it is possible to achieve as large as possible a cross-sectional area of the cooling duct, thereby enabling the flow of coolant to be improved.

As an alternative, the cross-sectional shape fills the said cross-sectional region at least over 75%, particularly preferably at least over 80%, in particular with the proviso that the cross-sectional shape is situated outside an inner boundary diameter of at least 10% or at least 15% or at least 20%. Although this slightly reduces the cross-sectional area of the cooling duct, mechanical stability can be improved.

The curve segment is preferably defined by a circular segment. As an alternative, the curve segment can be defined by an ellipse. The inner curve segment and the outer curve segment can have different geometrical shapes.

In an alternative, it would be conceivable for the outer curve segment to have approximately the shape of a straight line which is of curved design at the end, wherein the curve is adjoined by the tangents. This shape provides a kind of triangle.

The diameter of the inner curve segment is preferably smaller than the diameter of the outer curve segment.

The curve segments are preferably of concave design towards the interior of the cooling duct. The shape of the cross section is therefore substantially that of a droplet.

The centres of the curve segments preferably lie on a common straight line extending radially with respect to and through the central axis.

If there are two cooling ducts, all the centres of the curve segments lie on a common straight line extending transversely with respect to and through the central axis.

In a first variant, the cross-sectional shape of the cooling duct in the cutting section lies within an outer boundary diameter which is at most 70% or at most 80% of the nominal diameter of the tool.

In a second variant, the cross-sectional shape of the cooling duct in the cutting section lies outside an inner boundary diameter, which corresponds to at least 10% or at least 15% or at least 20% of the nominal diameter of the tool.

A third variant is characterized in that the cross-sectional shape of the cooling duct in the cutting section lies within an outer boundary diameter which is at most 70% or at most 80% of the nominal diameter of the tool, and/or in that the cross-sectional shape of the cooling duct in the cutting section lies outside an inner boundary diameter, which corresponds to at least 10% or at least 15% or at least 20% of the nominal diameter of the tool.

The centre of the inner curve segment and the centre of the outer curve segment are preferably at a distance from one another.

The position of the centre of the inner curve segment is preferably chosen in such a way that it does not lie in the region between the centre of the outer curve segment and the edge of the outer curve segment. The position of the outer curve segment is preferably chosen in such a way that it does not lie in the region between the centre of the inner curve segment and the edge of the inner curve segment.

The said distance between the centres is preferably in a range of from 4/8 to 6/8, in particular at 5/8, of the diameter of the outer curve segment. Expressed mathematically, this means that the distance is equal to 4/8 to 6/8 of the diameter of the outer curve segment or that the distance is equal to 5/8 of the diameter of the outer curve segment.

The distance preferably corresponds substantially to the diameter of the inner curve segment.

The diameter of the inner curve segment is preferably in a range of from 4/8 to 6/8, in particular at 5/8, of the diameter of the outer curve segment. In this case, the diameter of the outer curve segment is larger than that of the inner curve segment.

The clear width of the cross section of the cooling duct preferably increases with increasing distance from the central axis.

Further variants of the tool are characterized
in that the cross-sectional area of the cooling duct and/or the cross-sectional shape of the cooling duct and/or the position of the cross section of the cooling duct with respect to the central axis (M) is constant over the entire length of the cooling duct, and/or
in that precisely two cooling ducts situated diametrically opposite one another with respect to the central axis are provided, and/or
in that at least three or at least four cooling ducts situated at equal angular intervals are provided, and/or
in that the nominal diameter is less than 12 millimeters, in particular less than 8 millimeters, and/or
in that the at least one cooling duct extends in the manner of a helix around the central axis, wherein the pitch of the helix-type cooling duct is preferably in a range of from 0° to 40°, in particular in a range of from 6° to 40°, or in a range of from 6° to 30°, and/or
in that the diameter of the clamping section is equal to or greater than the nominal diameter of the cutting section.

The machining tool is preferably a twist drill or a milling tool or a reamer or a special tool.

A method for producing a machining tool according to the above description is characterized in that a stress analysis of the tool is performed under a predetermined load in a step of determining the cross-sectional shape, wherein the cross-sectional region in which the equivalent stress under a machining load should have a minimum possible value is determined.

The cross-sectional area of the cooling duct is optimized with respect to the cross-sectional region.

A blank is used to produce a machining tool according to the above description, wherein the blank comprises at least one cooling duct according to the above description.

Further embodiments are given in the dependent claims.

BRIEF DESCRIPTION OF THE DRAWINGS

Preferred embodiments of the invention are described below with reference to the drawings, which serve merely for illustration and are not to be interpreted as restrictive. In the drawings.

DESCRIPTION OF PREFERRED EMBODIMENTS

Figure 1:
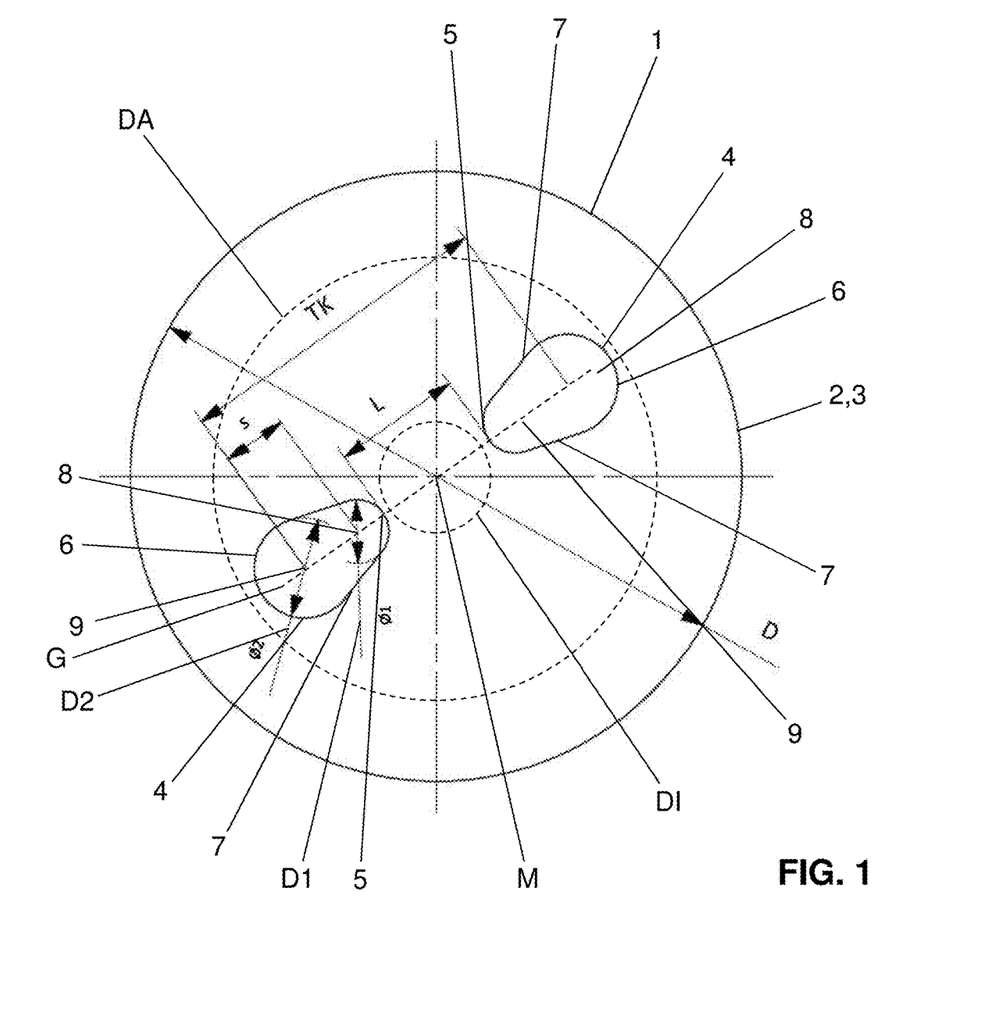
FIG. 1 shows a schematic view of a cross section through a machining tool according to one embodiment of the present invention.
Figure 2:
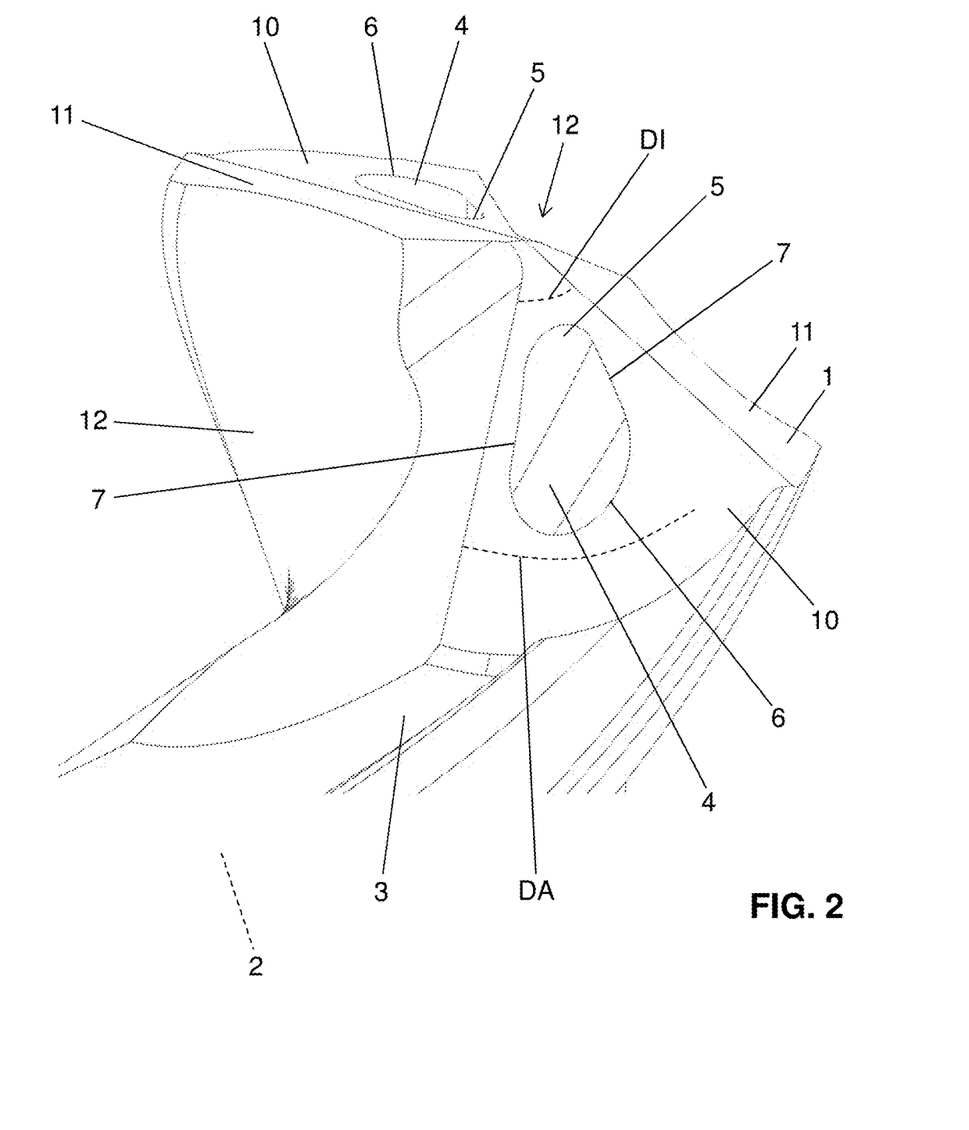
FIG. 2 shows a perspective view of a tip of a twist drill with an outlet of cooling ducts according to one embodiment of the present invention.
Figure 3:
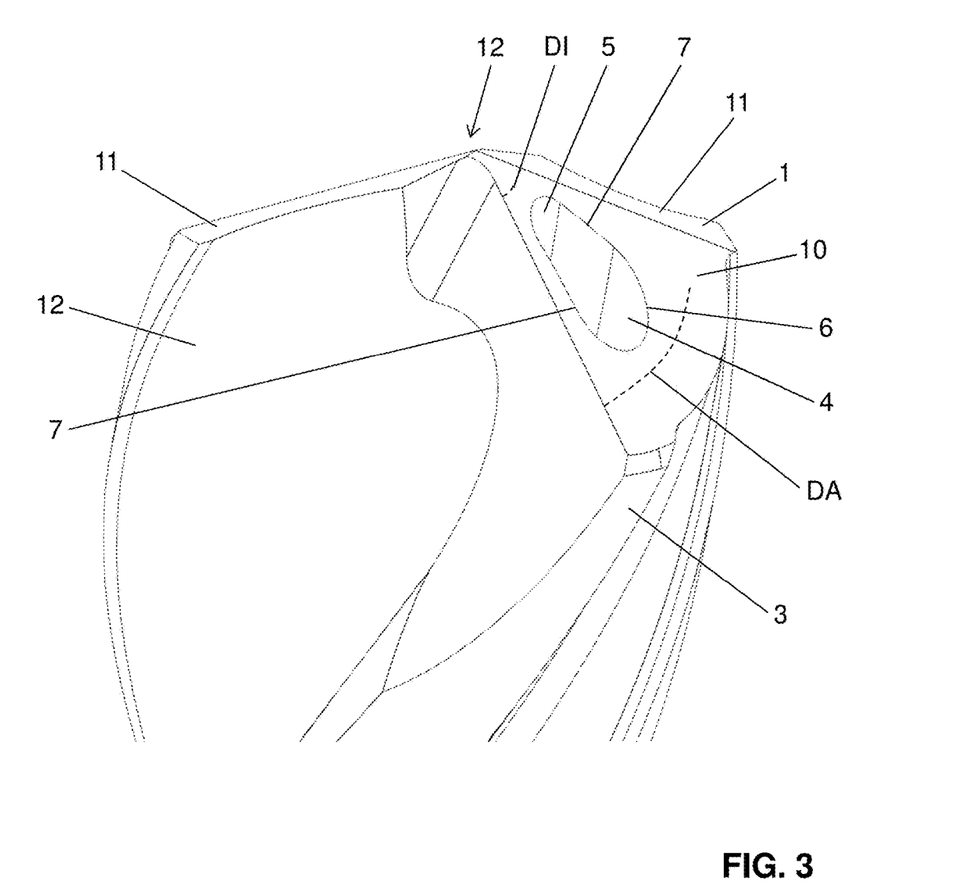
FIG. 3 shows another perspective view according to FIG. 2.

FIG. 1 shows a cross section at right angles to the central axis of a machining tool 1. The machining tool 1 comprises a clamping section 2, which extends along a central axis M, a cutting section 3, which adjoins the clamping section 2, and at least one cooling duct 4.

The cross section according to FIG. 1 can represent both the cross section of the clamping section 2 and that of the cutting section 3.

The clamping section 2 is used to clamp the tool 1 in a machine tool, and the cutting section 3 is used to machine a workpiece.

In the embodiment shown, two cooling ducts 4 are provided. The cooling ducts 4 are used to feed coolants and/or lubricants to the cutting section 3. The cooling ducts 4 preferably extend through the clamping section 2 and through the cutting section 3. In the embodiment shown, the two cooling ducts lie diametrically opposite one another with respect to the central axis M.

In other embodiments, it is also possible for more than two cooling ducts to be provided, which then also do not necessarily lie diametrically opposite. However, the angular interval between all the cooling ducts is preferably the same.

The cross-sectional shape of the cooling duct 4 is arranged in a cross-sectional region Q of the respective section in which the equivalent stress under a machining load has a value which is as small as possible. In FIG. 1, the cross-sectional region Q is shown by a dashed line. Here, the course of the dashed line is schematic and can also take some other form. Arranging the cooling duct 4 in a cross-sectional region Q in the clamping section 2 or in the cutting section 3 has the advantage that the cross-sectional shape of the cooling duct can be optimized in such a way that it is situated in locations which are subject to a low mechanical load. The overall stability of the tool can thereby be massively improved.

In the embodiment shown, the cross-sectional shape of the cooling duct 4 is defined by an inner curve segment 5, here a circular segment, an outer curve segment, here a circular segment, which is arranged at a distance from the latter, and by the two tangents 7 connecting the two curve segments 5, 6. Here, the tangents are tangential to the corresponding curve segments. The two curve segments 5, 6 and the two tangents 7 provide a continuous line which defines the cross-sectional shape of the cooling duct 4.

In other words, the cross-sectional shape of the cooling duct 4 in the embodiment shown has a droplet-shaped configuration.

Curve segment 5 does not necessarily have to be a circular segment. Curve segment 5 can also be elliptical or have some other shape.

Figure 7:
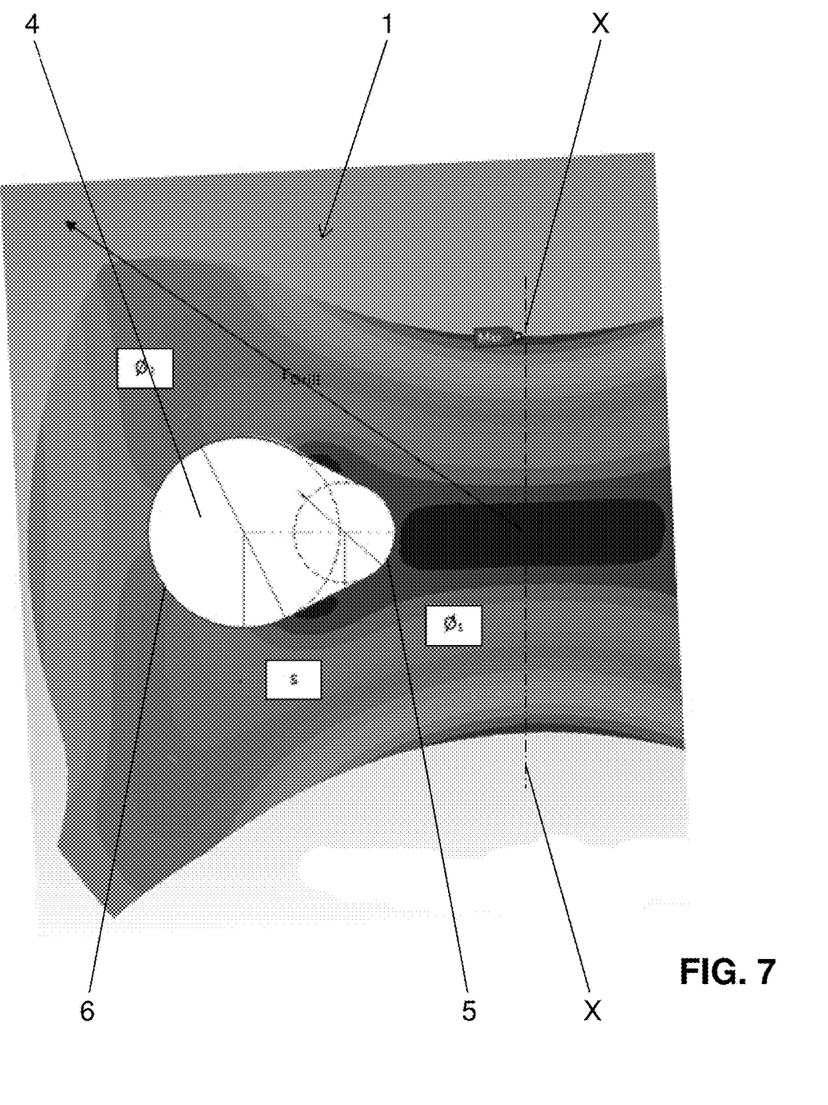
FIG. 7 shows a view of a cross section of a machining tool according to one of the preceding figures with the stress conditions shown.

The equivalent stress in the said cross-sectional region is preferably in a range of from 10% to 25% of the maximum equivalent stress, in particular with the proviso that the cross-sectional region is situated outside an inner boundary diameter DI of at least 10% or at least 15% or at least 20%. The stress conditions are shown more precisely in FIG. 7. It is clearly visible there that the values of the equivalent stress in the region of the cooling duct are small in comparison with other regions, especially in the region of the flute 12. The highest stress values are expected at location X. It is also clearly apparent that the equivalent stress is likewise relatively low in the region between the two cooling ducts.

The cross-sectional shape of the cooling duct preferably fills the said cross-sectional region Q, in which the equivalent stress has a value which is as low as possible during machining, to the maximum. This applies, in particular, with the proviso that the cross-sectional shape is situated outside an inner boundary diameter DI of at least 10% or at least 15% or at least 20%. That is to say that the cross-sectional area of the cooling duct 4 can be optimized, thus enabling the volume flow to be passed through the cooling duct 4 to be maximized.

As an alternative, the cross-sectional shape of the cooling duct 4 can fill the said cross-sectional region Q at least by 75%, particularly preferably at least by 80%. This applies, in particular, with the proviso that the cross-sectional shape is situated outside an inner boundary diameter DI of at least 10% or at least 15% or at least 20%. Here too, maximization of the cross-sectional area of the cross-sectional shape is the aim, wherein the tool is additionally designed to be more robust in respect of fractures by virtue of the less pronounced weakening.

Here, the diameter D1 of the inner curve segment 5 is smaller than the diameter D2 of the outer curve segment 6. As a result, the cooling fluid can be distributed in an optimum manner in the cross section of the cooling duct 4 during a rotation of the tool 1.

The curve segments 5, 6 are of concave design towards the interior of the cooling duct 4. In this way, the abovementioned droplet shape is created.

The centres 8, 9 of the curve segments 5, 6, here of the circular segments, are situated on a common straight line G. The straight line G extends radially with respect to the central axis M and here extends through the central axis M. In the case of two cooling ducts 4 arranged diametrically with respect to the central axis M, the centres of all the circular segments lie on a common straight line. With a different number of cooling ducts, however, this is not necessarily the case. However, as regards the cross-sectional shape of a cooling duct, it is advantageous if the centres 8, 9 of the circular segments 5, 6 of the corresponding cooling duct lie on a common straight line G.

Particularly in the cutting section 3, the cross-sectional shape of the cooling duct 4 lies within an outer boundary diameter DA. The outer boundary diameter DA is shown schematically in FIG. 1. The outer boundary diameter DA corresponds to at most 70% or at most 80% of the nominal diameter DN of the tool 1. The arrangement within this boundary diameter DA ensures that there is sufficient thickness of material toward the outside, i.e. between the outermost point of the outer circular segment 6 and the nominal diameter.

As regards the inner boundary, the cross-sectional shape of the cooling duct 4 in the cutting section 3 lies outside an inner boundary diameter DI. The boundary diameter DI is likewise shown in FIG. 1. The boundary diameter DI corresponds to at least 10% or at least 15% or at least 20% of the nominal diameter of the tool.

The centre 8 of the inner circular segment 5 and the centre 9 of the outer circular segment 6 are at a distance s from one another. Here, the distance s is chosen in such a way that the circular segments 5, 6 can be connected to one another by the tangents 7. The distance s is preferably in a range of from $4/8$ to $6/8$, in particular at $5/8$, of the diameter D2 of the outer circular segment 5. When represented in terms of a formula, this means:

$$s = 4/8 \ldots 6/8 * D2; \text{ in particular } s = 5/8 * D2$$

The distance s between the centres 8, 9 of the two circular segments 5, 6 corresponds substantially to the diameter D1 of the inner circular segment 5. However, it is also possible for the distance s to be greater or smaller. When represented in terms of a formula, this means:

$$s = D1$$

The diameter D1 of the inner circular segment 5 is preferably in a range of from $4/8$ to $6/8$, in particular at $5/8$, of the diameter D2 of the outer circular segment 6. When represented in terms of a formula, this means:

$$D1 = 4/8 \ldots 6/8 * D2; \text{ in particular } D1 = 5/8 * D2$$

The dimension TK is also entered in FIG. 1. This dimension describes the distance between the centres of the outer curve segments 6. This distance is preferably in a range of from 40% to 70% of the nominal diameter, in particular in a range of from 45% to 55% of the nominal diameter.

The dimension L is also entered in FIG. 1. The dimension L is the minimum distance between the two cooling ducts.

FIGS. 2 to 5 show the machining tool 1 in the form of a twist drill. Here, the cooling duct 4 opens via the free surface 10 adjoining the main cutting edge 11. In this case, the cross section of the cooling duct 4 lies completely within the free surface 10. This can be seen from FIGS. 2 and 3.

Figure 4:
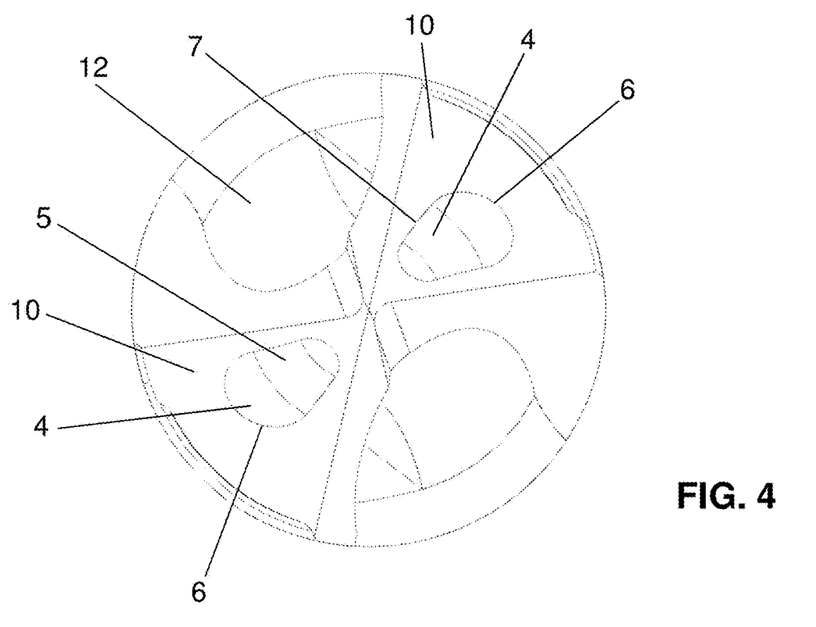
FIG. 4 shows a front view of the twist drill according to FIGS. 2 and 3.
Figure 5:
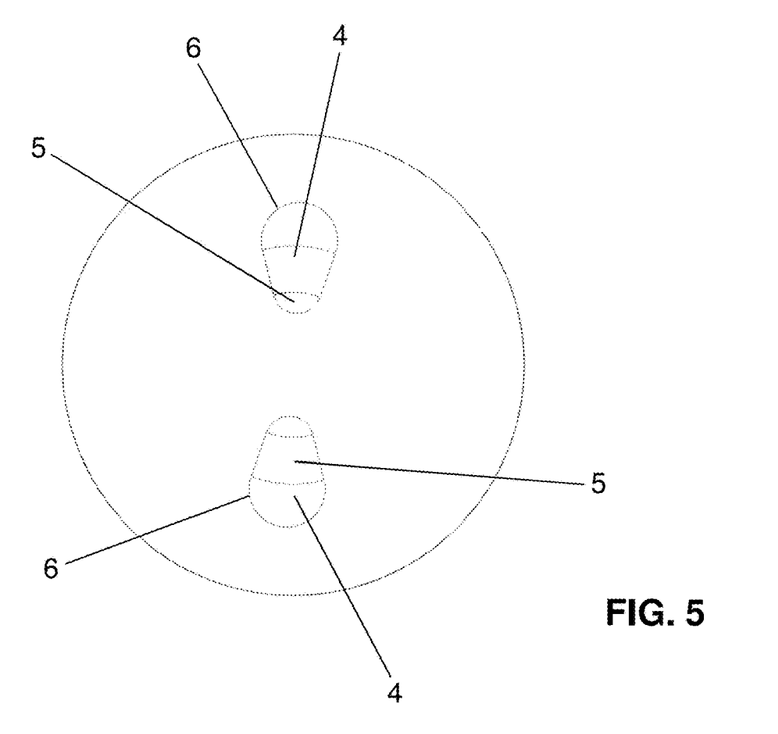
FIG. 5 shows a rear view of the twist drill according to FIGS. 2 to 4.

FIGS. 4 and 5 show corresponding views of the twist drill in the direction of the central axis M from the front (FIG. 4) and from the rear (FIG. 5). These figures show that the cross section of the cooling duct 4 is constant in cross section in terms of cross-sectional area and cross-sectional shape over the entire length of the cooling duct 4. The position of the cooling duct 4 in relation to the central axis M is likewise preferably constant over the entire length of the cooling duct. This means that the distance between the cooling duct 4 and the central axis M does not change over the entire length of the machining tool 1. In the case of a twist drill, the cooling ducts are preferably arranged in the manner of a helix, wherein they have the same pitch as the spiral grooves of the twist drill, at least in the cutting section 3.

Figure 6:
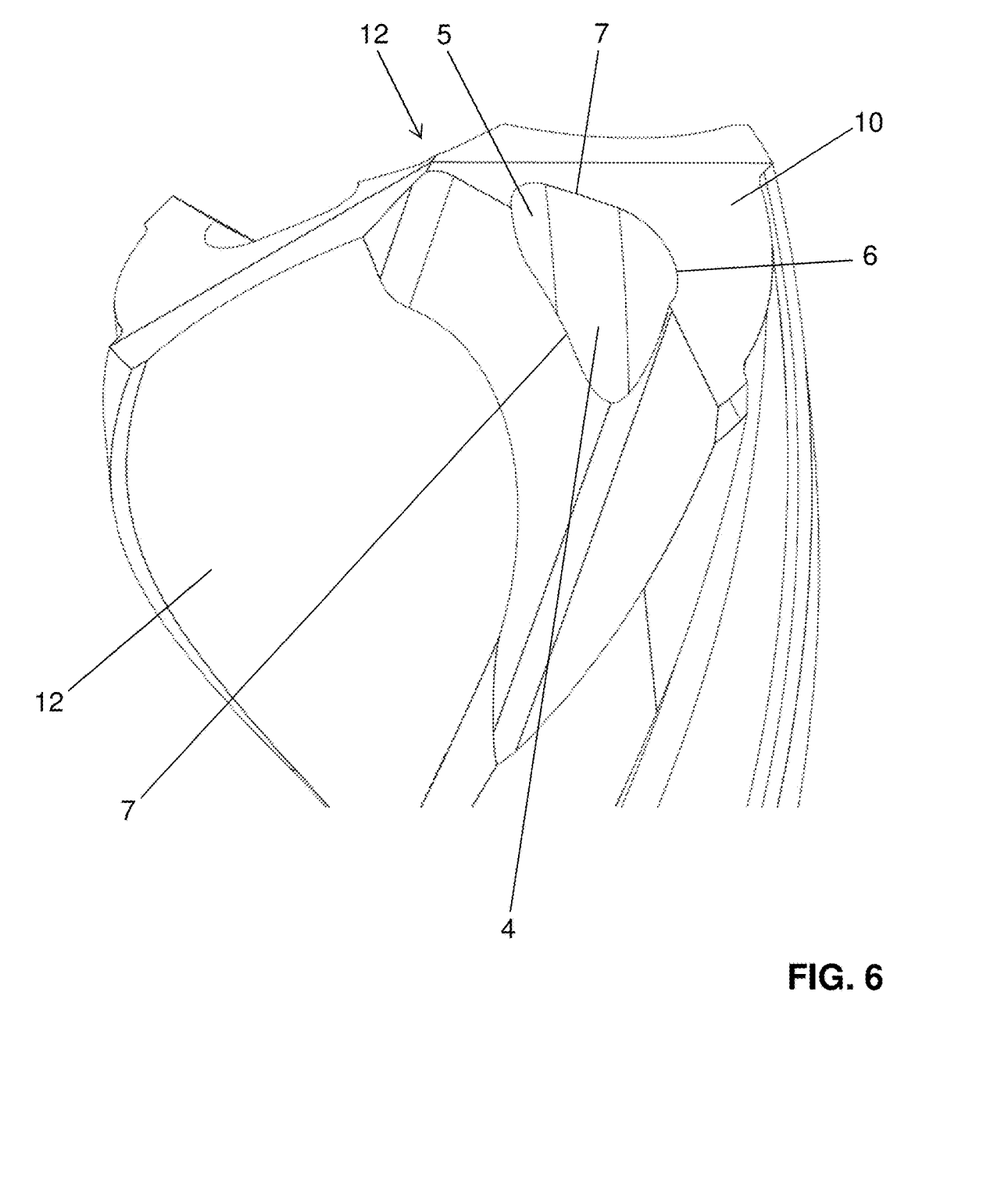
FIG. 6 shows a perspective view of a twist drill with an outlet of cooling ducts according to another embodiment of the present invention.

Another embodiment of the machining tool 1 in the form of a twist drill is shown in FIG. 6. The difference with respect to FIGS. 2 to 5 is that the cross section of the cooling duct 4 emerges into the open both via the free surface 10 and via the flute 12.

LIST OF REFERENCE SIGNS 1 machining tool
2 clamping section
3 cutting section
4 cooling duct
5 inner curve segment
6 outer curve segment
7 tangents
8 centre
9 centre
10 free surface
11 main cutting edge
12 flute
M central axis
DN nominal diameter
D1 diameter of inner curve segment
D2 diameter of outer curve segment
DA outer boundary diameter
DI inner boundary diameter
s distance between the curve segments
X maximum stress

The invention claimed is:

1. A machining tool comprising
a clamping section, which extends along a central axis,
a cutting section, which adjoins the clamping section and has a nominal diameter, and
at least one cooling duct, which extends in the clamping section and in the cutting section,
wherein a cross-sectional shape of the cooling duct is arranged in a cross-sectional region of the cutting section and the clamping section in which an equivalent stress under a machining load is minimized.

2. The machining tool according to claim 1, wherein the equivalent stress in said cross-sectional region is in a range of from 10 to 25% of a maximum equivalent stress, and wherein the cross-sectional region is situated outside an inner boundary diameter of at least 10% of the nominal diameter.

3. The machining tool according to claim 1, wherein the cross-sectional shape fills the cross-sectional region to its maximum, and wherein the cross-sectional shape is situated outside an inner boundary diameter of at least 10% of the nominal diameter.

4. The machining tool according to claim 1, wherein the cross-sectional shape fills the cross-sectional region at least over 75%, and wherein the cross-sectional shape is situated outside an inner boundary diameter of at least 10% of the nominal diameter.

5. The machining tool according to claim 1, wherein the cross-sectional shape of the cooling duct in the cutting section lies within an outer boundary diameter which is at most 80% of the nominal diameter of the tool, or wherein the cross-sectional shape of the cooling duct in the cutting section lies outside an inner boundary diameter, which corresponds to at least 10% of the nominal diameter of the tool.

6. The machining tool according to claim 1, wherein a center of an inner curve segment and a center of an outer curve segment are at a distance from one another.

7. The machining tool according to claim 6, wherein the distance is in a range of from 4/8 to 6/8, of a diameter of the outer curve segment,
or
wherein the distance corresponds substantially to a diameter of the inner curve segment.

8. The machining tool according to claim 1, wherein a diameter of an inner curve segment is in a range of from 4/8 to 6/8 of a diameter of an outer curve segment.

9. The machining tool according to claim 1, wherein a width of the cross section of the cooling duct increases with increasing distance from a central axis.

10. The machining tool according to claim 1,
wherein a cross-sectional area of the cooling duct or the cross-sectional shape of the cooling duct or a position of the cross section of the cooling duct with respect to a central axis is constant over an entire length of the cooling duct, or
wherein two cooling ducts situated diametrically opposite one another with respect to the central axis are provided, or
wherein at least three or at least four cooling ducts situated at equal angular intervals are provided, or
wherein the nominal diameter is less than 12 millimeters, or
wherein the at least one cooling duct extends helically around the central axis, wherein a pitch of the helical cooling duct is in a range of from 0° to 40°, or
wherein a diameter of the clamping section is equal to or greater than the nominal diameter of the cutting section.

11. The machining tool according to claim 1, wherein the machining tool is a twist drill or a milling tool or a reamer.

12. A method for producing a machining tool according to claim 1 comprising performing a stress analysis of the tool under a predetermined load in a step of determining the cross-sectional shape, wherein a cross-sectional region in which an equivalent stress under a machining load has a minimum possible value is determined and wherein based on the determinations, said tool is produced by adding said at least one cooling duct in said cross-sectional region of the cutting section and the clamping section in which an equivalent stress under a machining load is minimized.

13. A blank for producing a machining tool according to claim 1, wherein the blank comprises at least one cooling duct.

14. The machining tool according to claim 1, wherein the cross-sectional shape of the cooling duct is defined by an inner curve segment, an outer curve segment, arranged at a distance from the outer curve segment, and by two tangents connecting the two curve segments.

15. The machining tool according to claim 14, wherein at least one of the inner curve segment and the outer curve segment is defined by a circular segment; or wherein at least one of the inner curve segment and the outer curve segment is defined by an ellipse; or wherein the outer curve segment has approximately a shape of a straight line with a curve at an end, wherein the curve is adjoined by the tangents to define a triangular shape.

16. The machining tool according to claim 14, wherein a diameter of the inner curve segment is smaller than a diameter of the outer curve segment.

17. The machining tool according to claim 14, wherein the inner curve segment and the outer curve segment are of concave design towards an interior of the cooling duct.

18. The machining tool according to claim 14, wherein centers of the inner curve segment and the outer curve segment lie on a common straight line extending radially with respect to and through a central axis.

* * * * *